US009616263B2

(12) United States Patent
Hagquist et al.

(10) Patent No.: US 9,616,263 B2
(45) **Date of Patent: *Apr. 11, 2017**

(54) BIODEGRADABLE SUSPENSION FORMING COMPOSITIONS

(71) Applicant: EarthClean Corporation, South St. Paul, MN (US)

(72) Inventors: James Alroy E. Hagquist, St. Paul, MN (US); Robert M. Hume, III, Woodbury, MN (US); Terrance L. Lund, Woodbury, MN (US); Roderick L. Lund, Woodbury, MN (US)

(73) Assignee: EarthClean Corporation, South Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,603

(22) Filed: Mar. 31, 2016

(65) Prior Publication Data

US 2016/0206908 A1 Jul. 21, 2016

Related U.S. Application Data

(60) Division of application No. 14/611,657, filed on Feb. 2, 2015, now abandoned, which is a division of application No. 14/198,806, filed on Mar. 6, 2014, now Pat. No. 8,945,437, which is a continuation of application No. 13/851,190, filed on Mar. 27, 2013, now Pat. No. 8,734,689, which is a continuation of application No. 13/471,493, filed on May 15, 2012, now Pat. No. 8,408,323, which is a continuation of application No. 12/890,761, filed on Sep. 27, 2010, now Pat. No. 8,192,653.

(60) Provisional application No. 61/247,215, filed on Sep. 30, 2009.

(51) Int. Cl.

| | |
|---|---|
| ***C09K 21/14*** | (2006.01) |
| ***A62D 1/02*** | (2006.01) |
| ***A62C 3/02*** | (2006.01) |
| ***A62C 2/00*** | (2006.01) |
| ***A62D 1/00*** | (2006.01) |

(52) U.S. Cl.

CPC ............. *A62D 1/0064* (2013.01); *A62D 1/00* (2013.01); *A62D 1/005* (2013.01); *A62D 1/0014* (2013.01)

(58) Field of Classification Search

None

See application file for complete search history.

(56) References Cited

U.S. PATENT DOCUMENTS

| | | | | |
|---|---|---|---|---|
| 1,030,909 A | | 7/1912 | Mesturino | |
| 1,339,488 A | | 5/1920 | Weiss | |
| 1,813,367 A | | 7/1931 | Thompson | |
| 2,875,044 A | | 2/1959 | Dunn | |
| 3,080,316 A | | 3/1963 | Petertyl | |
| 3,196,108 A | | 7/1965 | Nelson | |
| 3,284,216 A | | 11/1966 | Kaplan | |
| 3,464,921 A | | 9/1969 | Erler | |
| 3,537,873 A | | 11/1970 | Degginger | |
| 3,719,515 A | | 3/1973 | Degginger | |
| RE28,474 E | | 7/1975 | Anderson | |
| 4,065,417 A | | 12/1977 | Wong | |
| 4,192,900 A | | 3/1980 | Cheng | |
| 4,216,242 A | | 8/1980 | Braverman | |
| 4,499,214 A | * | 2/1985 | Sortwell | C08J 3/03 106/205.8 |
| 4,820,380 A | | 4/1989 | O'Callaghan | |
| 5,663,122 A | | 9/1997 | Mueller | |
| 5,989,446 A | | 11/1999 | Hicks | |
| 6,209,655 B1 | | 4/2001 | Valkanas | |
| 6,245,252 B1 | | 6/2001 | Hicks | |
| 6,386,293 B1 | | 5/2002 | Bartlett | |
| 6,685,978 B1 | | 2/2004 | Hauksson | |
| 6,786,286 B1 | | 9/2004 | Bartlett | |
| 6,989,113 B1 | | 1/2006 | Mabey | |
| 7,033,526 B2 | | 4/2006 | Figiel | |
| 7,163,642 B2 | * | 1/2007 | Hagquist | A62C 2/065 169/44 |
| 7,189,337 B2 | | 3/2007 | Sortwell | |
| 7,476,346 B2 | * | 1/2009 | Hagquist | A62C 2/065 169/44 |
| 7,608,208 B2 | | 10/2009 | Houben | |
| 7,670,513 B2 | | 3/2010 | Erdner | |
| 2004/0197572 A1 | | 10/2004 | Bell | |
| 2005/0045849 A1 | * | 3/2005 | Sortwell | A62D 1/005 252/8.05 |
| 2006/0076531 A1 | * | 4/2006 | Hagguist | A62C 2/065 252/4 |
| 2006/0157668 A1 | | 7/2006 | Erdner | |
| 2007/0289752 A1 | | 12/2007 | Beck | |
| 2008/0185160 A1 | | 8/2008 | Diener | |
| 2008/0185553 A1 | | 8/2008 | Ziemer | |
| 2008/0277633 A1 | | 11/2008 | Leite | |
| 2009/0008103 A1 | | 1/2009 | Cordani | |
| 2009/0056957 A1 | | 3/2009 | Cordani | |
| 2009/0069496 A1 | | 3/2009 | Sortwell | |

(Continued)

FOREIGN PATENT DOCUMENTS

| | | | |
|---|---|---|---|
| GB | 760510 | * | 10/1956 |
| GB | 760510 A | | 10/1956 |

(Continued)

OTHER PUBLICATIONS

Carlopol.RTM. EZ-3 Polymer, A Versatile, High Efficiency, Self-Wetting Rheology Modifier for Household and I&I Applications, TDS-735, Edition: Dec. 29, 2009, Lubrizol.
PCT Search Report and Written Opinion dated May 4, 2011.

*Primary Examiner* — Joseph D Anthony

(74) *Attorney, Agent, or Firm* — Mark Joseph DiPietro

(57) ABSTRACT

A fire suppression composition includes starch, a pseudo-plastic, high yield, suspending agent, and agglomerating material.

6 Claims, No Drawings

(56) References Cited

U.S. PATENT DOCUMENTS

| | | | | |
|---|---|---|---|---|
| 2009/0095494 | A1 | 4/2009 | Cordani | |
| 2009/0146097 | A1 | 6/2009 | Lanciaux | |
| 2009/0151963 | A1 | 6/2009 | Sortwell | |
| 2009/0212251 | A1 | 8/2009 | Taylor | |
| 2010/0059237 | A1 | 3/2010 | Cordani | |
| 2011/0073794 | A1 * | 3/2011 | Hagquist | A62D 1/00 252/2 |
| 2014/0323619 | A1 * | 10/2014 | Palaikis | A62D 1/0028 524/52 |
| 2014/0343198 | A1 * | 11/2014 | Palaikis | A62D 1/0014 524/52 |

FOREIGN PATENT DOCUMENTS

| | | |
|---|---|---|
| WO | WO2006042064 | 4/2006 |
| WO | WO2006052245 | 5/2006 |

* cited by examiner

BIODEGRADABLE SUSPENSION FORMING COMPOSITIONS

RELATED APPLICATIONS

This application is a divisional of U.S. application Ser. No. 14/611,657 filed Feb. 2, 2015, which is a divisional of U.S. application Ser. No. 14/198,806, filed Mar. 6, 2014, now U.S. Pat. No. 8,945,437, which is a continuation of U.S. application Ser. No. 13/851,190, filed Mar. 27, 2013, now U.S. Pat. No. 8,734,689, which is a continuation of U.S. application Ser. No. 13/471,493, filed May 15, 2012, now U.S. Pat. No. 8,408,323, which is a continuation of U.S. application Ser. No. 12/890,761, filed on Sep. 27, 2010, now U.S. Pat. No. 8,192,653, which claims priority from U.S. Provisional patent Application No. 61/247,215, filed on Sep. 30, 2009 and titled "BIODEGRADABLE SUSPENSION FORMING COMPOSITIONS," the entire disclosures of all being incorporated herein by reference.

BACKGROUND

Fire is a continuing danger to life and property worldwide. In rural areas forest, brush, and grassland fires cause immense damage each year. This destruction is not only in terms of the dollar value of timber, wildlife and livestock, but the catastrophic effects on erosion, watershed equilibrium and related problems to the natural environment. In urban areas, fire and the damage from large quantities of water used to extinguish a fire is responsible for the destruction of buildings with the loss of billions of dollars annually. Most importantly, fire is a major danger to human life.

Over the years man has found numerous methods for combating fires. The use of water, chemicals and other extinguishing materials are well documented. Water treated with a wetting agent has been proven to be more effective on a Class A fire where good water penetration is needed to reach and extinguish the seat of the fire. Currently, there have been efforts in the area of pretreatment with chemical retardants or suppressants. A number of these pretreatments have been developed and used for fighting rural forest fires. For example, antimony oxide and its complexes, borates, carbonates, bicarbonates, ammonium phosphate, ammonium sulfates, and other salts capable of being hydrated, have been demonstrated to have useful properties as firefighting chemicals. However, although the fire inhibiting properties of the borates, carbonates and bicarbonates have been established, the use of these materials for vegetation fires has been limited because of their tendency to inhibit plant growth when used in large quantities.

Another method of fighting fires is the pretreatment of flame-retardant materials on combustible surfaces that lead to the creation of intumescent coating materials. Intumescent materials expand with heat, similar to a vermiculite which expands when exposed to steam. The expanded layer then protects the original surface from heat and flame. The problem is that an expanded intumescent is also very fragile. This problem was soon realized, and the intumescent needed a protective hard outer coating. This lead to methods using carbonaceous materials to form a char instead of the materials being consumed by the fire.

In addition to all these problems, the most difficult problem to overcome for chemical retardant formulations is that they are relatively expensive, compared to water. Also of concern is the environmental impact of absorbent particles presently used in various gel formulations. The absorbent particles pose an environmental risk once used to fight a fire, particularly when used on a large scale, such as a forest fire. The cost factor also comes into conflict with applying them in large quantities, as is often required. In combating or preventing forest, brush and grass range fires, a considerable amount of effort has been spent in the search for low cost or waste materials that are both available in quantity and inexpensive.

BRIEF SUMMARY

The present disclosure relates to biodegradable suspension forming compositions. In particular the present disclosure relates to fire suppression biodegradable suspension forming compositions that can form a crust after making contact with a heat source.

In one illustrative embodiment, a fire suppression composition includes starch, a pseudo-plastic, high yield, suspending agent, and an agglomerating material.

These and various other features and advantages will be apparent from a reading of the following detailed description.

DETAILED DESCRIPTION

In the following description, it is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to compositions that form suspension compositions. The compositions are particularly useful as fire supersession compositions when diluted with water forming a suspension. The composition includes starch, a pseudo-plastic, high yield, suspending agent, and paraffin or olefin that forms a suspension when combined with water. The suspension composition can form a crust after making contact with a heat source. After crusting-over occurs, continued heating or burning near the compositions causes the crust to turn to a carbonized char. At this point, the suspension composition consists of an outer coat of char, which forms a hard, intumescent coating, and a soft interior of a gelled aqueous composition. This synergist combination of hard shell protecting a soft interior gel, remains in place until all the composition's water has been evaporated. The composition functions as a heat sink, maintaining a substrate temperature below around 100 degrees centigrade. While the present disclosure is not so limited, an appreciation of various aspects of the disclosure will be gained through a discussion of the examples provided below.

The disclosed compositions can be augmentations to water, either from concentrate or dry blends, used to extinguish fires, for example. The concentrate or dry blend is added to a water reservoir and mixed in or allowed to recirculate to form the fire suppression suspension. These compositions use pseudo-plastic high yield suspending agents, starch, paraffin or olefin and a basic material, added to water to produce a stable, nonsettling augmentation to water. The aqueous suspension is easily pumped or sprayed by typical high pressure pumping equipment or by low-pressure individual back tanks. The suspension composition has a “high yield value,” meaning it has an initial resistance to flow under stress but then is shear thinning, and when used, exhibits “vertical cling,” meaning it has the ability at rest, to immediately return to a thixotropic gel. The material that does not separate or settle, can be easily sprayed and immediately thickens when it contacts a wall or ceiling surface. This gives the firefighter, for example, the ability, unlike water alone, to build thickness and hold the aqueous gel of the inventive composition on vertical or overhead surfaces. The aqueous gel of the suspension composition's mass and the vertical cling both acts as a heat sink capable of clinging to vertical and overhead surfaces. This clinging to the surfaces causes the overall temperature of the surfaces to remain below the boiling point of water. The heat sink effect does not allow the temperature of the surface coated with the aqueous gel of the composition to exceed about 100 degree centigrade until all the water in the composition has been evaporated. To produce this shear thinning effect and then cling, the composition uses a pseudo-plastic high yield-suspending agent.

In many embodiments the composition includes starch, a pseudo-plastic, high yield, suspending agent, paraffin or olefin and a basic material. These materials can be mixed or blended utilizing a mixer to obtain a powered composition. It has been found that these compositions quickly form a stable suspension when combined with water. In many embodiments, the suspension composition has a pH in the range of 5.0 to 8.0 and the suspension composition clings to a surface positioned in any orientation, and forms an exterior intumescent char coating upon fire contact, while retaining an interior aqueous gel composition.

In many embodiments the composition (e.g., powdered composition) includes 25-55 wt % pseudo-plastic, high yield, suspending agent, 35-65 wt % starch, 0.1-10 wt % paraffin or olefin, and 0.5-15 wt % basic material. In many embodiments the composition (e.g., powdered composition) includes 30-50 wt % pseudo-plastic, high yield, suspending agent, 40-60 wt % starch, 1-5 wt % paraffin or olefin, and 0.5-10 wt % basic material.

These compositions can be diluted with water to form an aqueous suspension. In many embodiments the aqueous suspension includes from 0.1 to 5% wt of the composition or powdered composition. In some embodiments, the aqueous suspension includes from 0.5 to 1% wt of the composition or powdered composition. It has been found that the aqueous suspension composition clings to a surface positioned in any orientation, and forms an exterior intumescent char coating upon fire contact, while retaining an interior aqueous gel composition.

There are many types of pseudo-plastic high yield suspending agents or rheology modifiers that can be used successfully in the inventive composition. Two of the major groups of such suspending agents are laponites, a synthetic smectite clay, and CARBOPOLS™ (that are generally high molecular weigh homo- and copolymers of acrylic acid cross linked with a polyalkenyl polyether. Other polymers and synthetic clays are suitable and may be used in combination to develop special pseudo-plastic high yield suspending agent characteristics. In using a combination of these suspending agents, synergism is found, for example, between laponites and CARBOPOLS™, where a blend offers improved characteristics for the composition. Of the group of laponites, which are synthetic smectite clays closely resembling the natural clay mineral hectoritic, it was found that Laponites RD and RDS provide the best performance. Laponites RD and RDS are layered hydrous magnesium silicates that disperse rapidly in water without the need for high shear. Laponites RD and RDS are manufactured by Southern Clay Products, Inc., Gonzales, Tex. 78629, and are commercially available from Fitz Chemical Corporation, Itasca, Ill. 60143.

In another major group of suspending agents, the CARBOPOLS™, one particularly effective material is CARBOPOLS™ EZ-3, a hydrophobically modified cross-linked polyacrylate powder. The polymer is self-wetting and requires low agitation for dispersion. The convenience of low agitation is very evident in the very short wetting out time needed, when making a concentrate. CARBOPOLS™ EZ-3 is commercially available from Noveon, Inc., Cleveland, Ohio 44141. These materials hold solid particles in suspension without allowing the solids to settle. These materials have a shear thinning rheology so they can be pumped or sprayed onto a surface without the loss of cling. The CARBOPOLS™ EZ-3 is the more efficient of pseudo-plastic high yield suspending agents tested and the Laponite RDS one of the fastest to build in viscosity, after shear thinning. The laponites are especially sensitive to electrolytes or the typical salts in water. Many pseudo-plastic high yield suspending agents need to be fully dispersed and hydrated in water to achieve the best performance characteristics. The suspension composition improves the overall efficiency of putting fire out with water. Other suitable pseudo-plastic, high yield, suspending agents include modified guar and xantham gums, casein, alginates, modified cellulose, including methyl cellulose, hydroxyethyl cellulose, hydroxypropyl cellulose and carbomethyl cellulose, gum tragacanth used individually or in combination.

The suspension compositions have a high yield value with a “shear thinning capacity” which means, the suspension composition becomes thin when pumped and instantly thixotropic or sag resistant, at rest. Thus, after being pumped and sprayed, the suspension composition is capable of clinging to a vertical or overhead surface. Any starch can be used in the suspension compositions. Examples of starches include corn, wheat, potato, tapioca, barley, arrowroot, rice or any combination of starches.

Dry starch contains about 12% water and has a particle size in a range from 1 to 50 micrometers. When soaked in water, the starch associates and holds up to 18% water and the particle size increases to 40 micrometers. As the starch/water mixture is heated, in this case by a fire, the starch forms a gel or association with all the surrounding water starting around 70 degrees centigrade. Thus, when the composition is heated, either from the substrate or the air side, the starch absorbs more water at the interface and becomes thicker. On the substrate side, the composition first rides on its own vapor and, as it cools, forms its own film on the substrate surface. On the air side, where evaporation largely occurs, the composition first thickens and then crusts over and eventually is converted to a carbonized char. The char formed is a hard, intumescent coating, which slows the evaporation of water from the composition. In essence, the composition's own film and char act as a vessel to contain the soft-gelled composition, which now acts as a heat sink to cool the backside of the intumescent char. This synergism between the intumescent hard coating and the composition's aqueous gel helps optimize a very limited amount of water. The char/gel coating further reduces the available combustible material to the fire, and also reduces the smoke emission. There are no dangerous chemical reactions caused by the application of the inventive composition and its byproducts are neither corrosive nor toxic.

Hydrophobic agglomerating material can be added to the composition. It has been found that the hydrophobic agglomerating material improves the material properties as compared to compositions that do not include the composition. While not wishing to be bound to any particular theory, it is believed that the hydrophobic agglomerating material improves the speed at which the aqueous gel or aqueous suspension is formed. In many fire suppression applications, quick formation of the aqueous gel or aqueous suspension is important.

In many embodiments the hydrophobic agglomerating material includes liquid paraffins or olefins. Paraffin is the common name for alkane hydrocarbons with the general formula $C_nH_{2n+2}$. Liquid paraffin generally have less than 20 carbon atoms. In many embodiments the paraffin has from 10 to 15 carbon atoms and is linear, or has from 14 to 18 carbon atoms and is linear. Olefin is the common name for alkene hydrocarbons with the general formula $C_nH_{2n}$ where the hydrocarbon is not saturated. In many embodiments the olefin has from 10 to 15 carbon atoms and is linear, or has from 15 to 18 carbon atoms and is linear.

Commercially available paraffins and olefins include BIO-BASE™ 100LF (linear internal olefin with a carbon chain length between C15 and C18), BIO-BASE™ 300 (linear paraffin with a carbon chain length between C11 and C14), BIO-BASE™ 200 (linear alpha olefin with a carbon chain length between C16 and C18), BIO-BASE™ 220 (linear alpha olefin with a carbon chain length between C14 and C16), BIO-BASE™ 250 (linear alpha olefin with a carbon chain length between C14 and C18), BIO-BASE™ 360 (blend of iso-paraffins and linear paraffins with a carbon chain length between C15 and C16), all are available from Shrieve Chemical Products Company (Woodlands, Tex.). It has been found that the presence of the hydrophobic agglomerating material improves the performance of the composition and reduces the dusting of the composition and reduces the foam generation when the dry composition is combined with water to form the aqueous suspension.

The compositions can include a neutralizer or basic material. In many embodiments the basic material is any material capable of increasing pH when added to an aqueous material (e.g., forming the aqueous suspension). In many embodiments the basic material includes caustic soda or sodium hydroxide. In many embodiments, starch at least partially encapsulates particles of the neutralizer or basic material (e.g., caustic soda particles).

Thus, embodiments of the FIRE SUPPRESSION BIODEGRADABLE SUSPENSION FORMING COMPOSITIONS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A fire suppression composition comprising a concentrate free of liquid water, the concentrate adapted to dilution with water to form a fire suppression suspension, the concentrate comprising a dispersion comprising:

about 0.1 to 10 wt. % of a hydrophobic liquid material comprising an olefin having 20 carbon atoms or less;

about 35 to 65 wt. % of a starch; and about 25 to 55 wt. % of a pseudoplastic, high yield, sodium polyacrylate suspending agent;

wherein the composition and its byproducts are neither corrosive nor toxic.

2. The composition of claim 1 wherein the composition comprises a blended starch.

3. The composition of claim 1 wherein the hydrophobic liquid material comprises an olefin having 10 to 18 carbon atoms.

4. The composition of claim 1 comprising a powdered or agglomerated material.

5. An aqueous composition comprising a dispersion comprising 0.1 to 5 wt. % of the fire suspension composition of claim 1 in water.

6. The composition of claim 1 additionally comprising a clay.

* * * * *